W. BRAUNSDORF.
TIDE MOTOR.
APPLICATION FILED SEPT. 11, 1912.
1,048,389.
Patented Dec. 24, 1912.
2 SHEETS—SHEET 2.
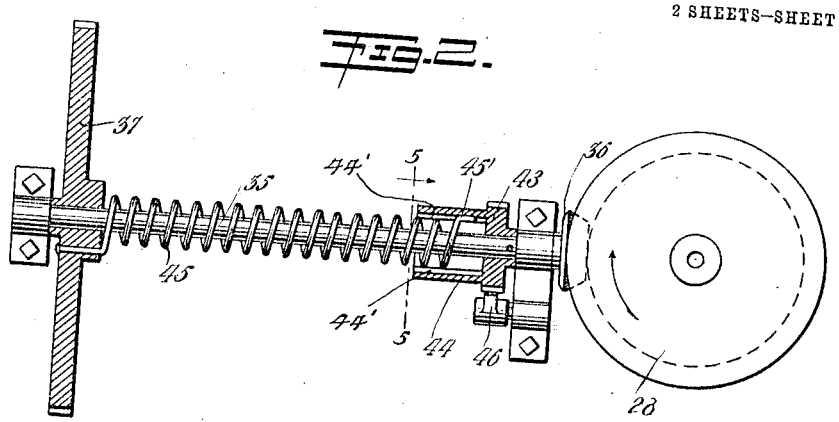
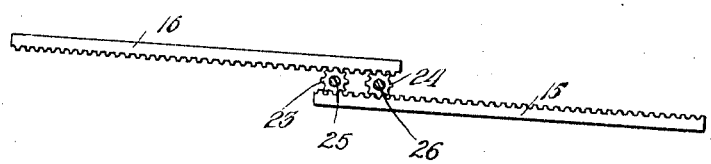
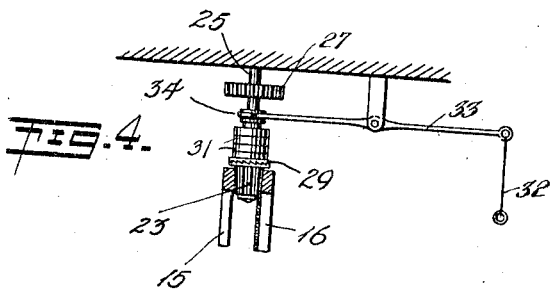
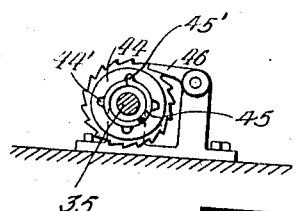
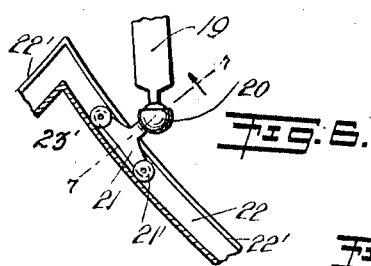
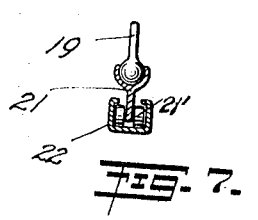
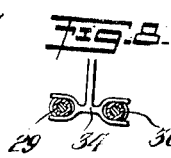
WITNESSES
G. Robert Thomas
Geo. L. Beeler
INVENTOR
William Braunsdorf
BY
ATTORNEYS

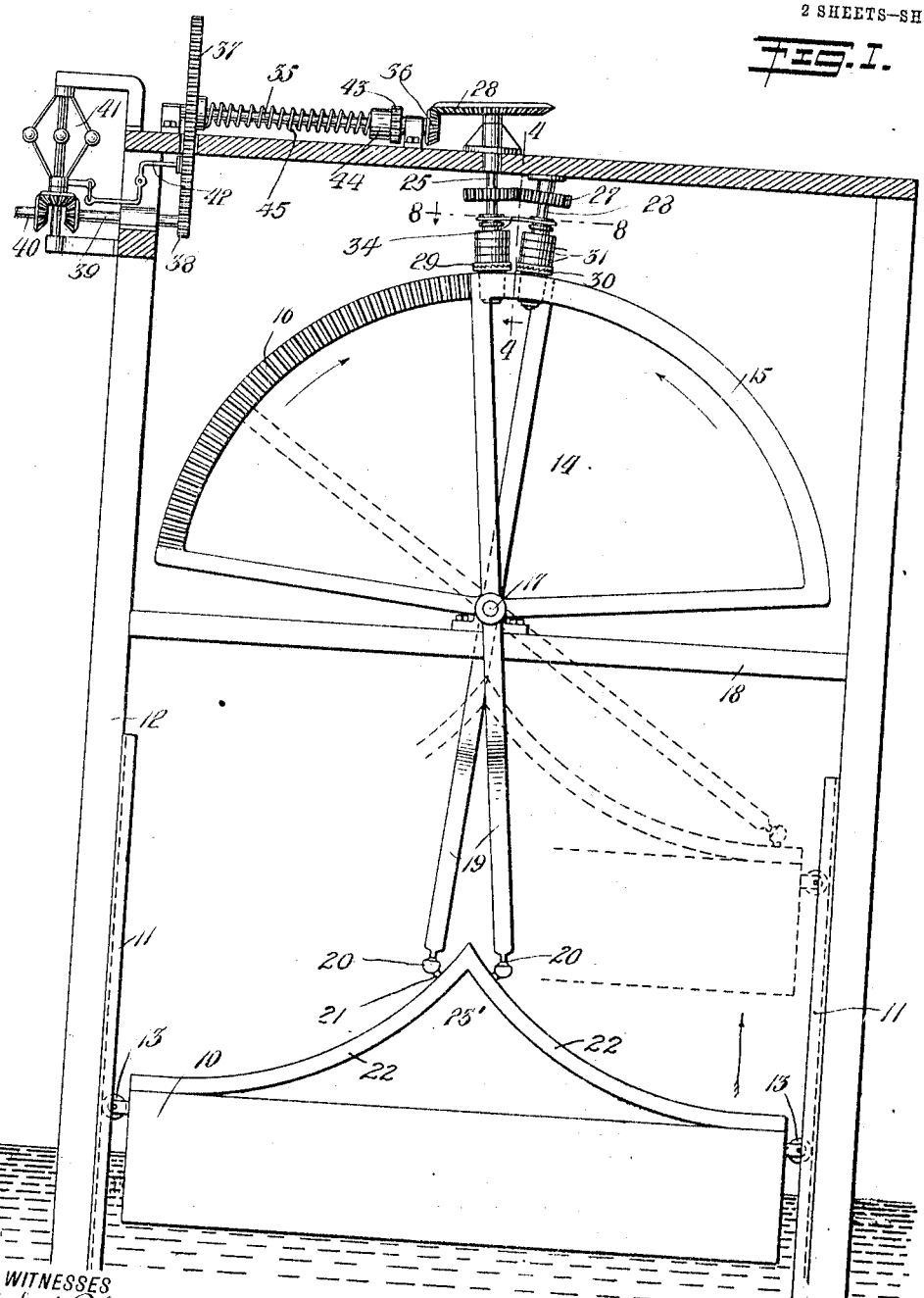

UNITED STATES PATENT OFFICE.

WILLIAM BRAUNSDORF, OF NEW YORK, N. Y.

TIDE-MOTOR.

1,048,389.  Specification of Letters Patent.  Patented Dec. 24, 1912.

Application filed September 11, 1912.  Serial No. 719,732.

*To all whom it may concern:*

Be it known that I, WILLIAM BRAUNSDORF, a citizen of the United States, and a resident of the city of New York, borough of Manhattan, in the county and State of New York, have invented a new and Improved Tide-Motor, of which the following is a full, clear, and exact description.

This invention relates to hydraulic engineering and has particular reference to tide powers, the primary object of the invention being to construct a tide motor which will utilize the buoyant force of the rising tide to lift a float and which float during the flow of the tide will be operative through its weight to drive any suitable machinery in the same direction in which such machinery will be operated during the rise or ebb of the tide.

A further object of the invention is to improve this class of motors so as to utilize the force of the tide in a better and more reliable manner than has heretofore been accomplished.

The foregoing and other objects of the invention will hereinafter be more fully described and claimed and illustrated in the drawings accompanying this specification in which like characters of reference indicate corresponding parts in all the views, and in which—

Figure 1 is a side elevation of a preferred embodiment of the invention, the same being illustrated, however, somewhat diagrammatically; Fig. 2 is a plan view, partly in section, of the means for transmitting the power from a rotary element; Fig. 3 is a fragmentary plan view of the master gears and pinions between the same; Fig. 4 is a vertical detail at right angles to Fig. 1 and on the line 4—4 of said figure; Fig. 5 is a transverse section on the line 5—5 of Fig. 2; Fig. 6 is a detail of the upper end of the yoke; Fig. 7 is a transverse section on the line 7—7 of Fig. 6; and Fig. 8 is a transverse section on the line 8—8 of Fig. 1.

Referring more particularly to the drawings, I show at 10 a float of any suitable size, form or construction, the same being guided vertically by any suitable guides 11 supported by a stationary framework 12. Preferably the float will be provided with any desired number or arrangement of anti-friction rollers 13, which coöperate with said guides 11. It will be understood that the float will be of a substantially rigid construction, and having a buoyancy in the water sufficient to cause it to be lifted by the water with considerable force and which force will be operative upon the movable parts of the motor through the gravitation of the float during the flow of the tide with practically the same degree of force as in the other direction.

Journaled in any suitable manner upon the stationary framework 12 is an actuator 14 adapted to be operated by said float in either its ascent or descent, said actuator being movable and adapted to develop and transmit power from the force of the tide to any suitable mechanism or machinery. As herein illustrated said actuator comprises a pair of master gears 15 and 16 pivoted co-axially at 17 upon a cross member 18 of the frame. Each of the master gears is provided with an arm 19 projecting therefrom on the opposite side of the pivot 17 and having a ball and socket connection 20 with a shoe 21 adapted to roll along a channel 22 of the yoke 23' carried rigidly by the float. As shown in Fig. 1, the arms 19 of the respective master gears lie in substantially the same plane at their lower ends as the vertical plane of the yoke, and diverge from each other at an angle more or less acute, depending upon the elevation of the float. At maximum low tide the angle between the arms will be the most acute, and at maximum high tide it will be the most obtuse. Each of the shoes 21 is provided preferably with a plurality of anti-friction rollers 21' which, when the float is ascending, will bear against the bottom of the channel 22 in which said shoe operates, and when the float is descending said rollers will bear against the upper flanges 22' of said channel. The channels constituting the yoke may be of any suitable general form, but preferably they are so shaped as to establish a substantially regular angle between the axis of the arms 19 and the effective portion of the channels with which said arms coöperate. In other words, said channels are preferably curved whereby the maximum force of the float will be exerted tending to turn the master gears on their axis.

As shown in Figs. 1 and 3 the master gears are mounted for partial rotation or oscillation on the same axis in parallel planes, and by reason of the float means for operating the gears, they will always be operated simultaneously in opposite directions. At 23 and 24 are shown a pair of pinions both in constant mesh with the teeth of the master gears 15 and 16. Said pinions are mounted loosely upon shafts 25 and 26 respectively, the shaft 25 being hereinafter regarded as the power shaft. Said shafts are connected by means of gear wheels 27 whereby they both operate simultaneously in opposite directions. To the upper end of the power shaft is secured a large gear wheel 28 from which the power may be transmitted in any suitable manner.

A pair of clutches 29 and 30 of any suitable nature are mounted upon the shafts 25 and 26 respectively, whereby said shafts may be driven directly in alternation from the pinions 23 and 24. The clutches are arranged oppositely to each other, one of said pinions being connected to each of the clutches and each clutch including a sleeve slidable longitudinally of its shaft and splined thereto, whereby the clutch being driven will drive said shaft. With the parts moving in the direction indicated by the arrows on Fig. 1, the pinion 23 will be driven from both master gears and will drive the shaft 25 in the direction indicated in Fig. 2 by direct operation of the clutch 29. The pinion 24 will be driven, of course, in the same direction as the pinion 23, but the shaft 26 being driven in the opposite direction from the shaft 25 will cause the clutch 30 to slip, and hence the pinion 24 will be idle during the upward movement of the float. The clutches tend to be held in operation by any suitable means such as weights 31 and both clutches may be lifted out of operation to throw the motor out of gear by pulling down upon a rope 32 connected to the outer end of a lever 33 and having its other end coöperating with a double yoke 34 connected to the upper portions of the clutches. During the descent of the float the gears 15 and 16 will be positively operated in the direction opposite from that indicated by the arrows on Fig. 1 when the rotation of the pinion 24 will positively drive the shaft 26 which in turn will drive the power shaft, the direction of rotation of the power shaft remaining, however, the same as before. In this instance, the clutch 29 will be idle while the pinion 23 is running in the same direction as the pinion 24.

The operation of the master gears being necessarily relatively slow corresponding to the rise and fall of the tides, it is necessary for the speed of the power shaft to be increased, and this may be done by any suitable or well known gearing. As an illustration, however, of such gearing, I show at 35 a shaft which, like all of the other movable parts, will be suitably supported by bearings and which carries at one end a pinion 36 meshing with the power shaft gear 28. At the other end said shaft carries a large gear 37 in turn meshing with the pinion 38 mounted on a shaft 39 and from which power may be taken in any suitable way to operate a machine whose main shaft may be represented at 40. If desired, or found necessary, a speed governor 41 may be geared to the high speed shaft and may have any suitable form of brake 42 adapted to coöperate with the gear 37 or any other suitable running part of the motor, whereby the rate of rotation of the wheel 37 and the high speed shaft may be controlled.

In order to take advantage of the irregularities incident to the rise and fall of tide water, both as to power and extent, I provide a flexible connection of any suitable nature between the shaft 35 and the gear 37. The flexible connection herein shown comprises a ratchet wheel 43 rigidly secured to the shaft and having a hollow hub 44 projecting toward the wheel 37. The hub is provided on its inner surface with a plurality of longitudinal grooves 44'. A strong coil spring 45 of any suitable length surrounds the shaft between the ratchet wheel and the gear 37 and has one end rigidly secured to the wheel and its opposite end fitted within the hollow hub 44 and with the extreme end extending into one of the grooves 44'. The outside circumference of the spring substantially approximates the internal diameter of the aforesaid hub, and the projecting end or finger 45' under normal operative conditions will constitute an effective connection between the ratchet wheel and the spring and thereby a connection with the gear 37. The ratchet wheel is prevented from reverse direction by means of a pawl 46. When the power shaft is operated in excess of the power taken therefrom through the high speed gearing above referred to, or in other words, when the ratchet wheel and shaft 35 over-run the gear 37, the spring 45 will be wound up, storing the power which would otherwise be used or wasted; therefore, it is necessary to provide some sort of automatic slip mechanism between the ratchet wheel or power shaft and the gear 37, whereby when the power is exerted in excess of the amount used, no damage to the machinery can result. Accordingly, when the excess power causes the spring to be wound until it approximately hugs the shaft 35, its finger 45' will be withdrawn from the groove or grooves within the hub 44, permitting the motor or power to run independently of the gear 37 and machinery beyond the same. By the use of means of the character set forth I am enabled to store sufficient power in the spring 45 to insure constant operation of the high speed shaft even when the motor is inoperative due to the periods of rest incident to the high and low tides.

The several parts of the motor may be made of any suitable materials, and the relative sizes and proportions thereof may be variously designed to meet the conditions aimed at in the foregoing description without departing from the spirit of the invention hereinafter claimed.

Having thus described my invention, I claim as new and desire to secure by Letters Patent:—

1. In a tide motor, the combination of a vertically movable float, a pair of master gears having arms extending into coöperation with said float whereby the ascent or descent of the float will cause simultaneous rotation of said gears in opposite directions, and means in constant mesh with said gears for transmitting the rotation thereof always in the same direction.

2. In a tide motor, the combination of a float, means to guide the float for ascent and descent in accordance with the rise and fall of the tide, said float including a yoke, a pair of members journaled for rotation in parallel planes and each having an arm coöperating with said yoke, whereby a movement of the float will cause a corresponding rotation of said rotary members, and means to transmit the power from said members, said transmitting means including a shaft driven always in the same direction.

3. In a tide motor, the combination of a vertically movable float including a yoke comprising a pair of channels, a pair of master gears journaled for rotation in parallel planes and having rigid arms extending therefrom into the plane of said yoke, a shoe pivotally connected to the lower end of each arm and operating in its respective channel of said yoke, and means to transmit the power from said master gears when they are operated by the float in either direction.

4. In a tide motor, the combination of a vertically movable float including a yoke comprising a pair of curved channels, a pair of master gears journaled for rotation in parallel planes and having rigid arms extending therefrom into coöperation with said curved channels, whereby the effective force of the float upon the master gears will remain substantially constant throughout the movements of the float in either direction, and means to transmit the power from said master gears.

5. In a tide motor, the combination of a pair of master gears mounted for rotation in parallel planes, a float to operate said gears, a pair of pinions between and in constant mesh with both of said gears, a power shaft associated with one of said pinions, a countershaft associated with the other pinion, means to cause constant rotation of either of said shafts from the other, and a pair of clutches operative between said pinions and the respective shafts, whereby the rotation of the master gears in either direction will cause both gears to positively drive one pinion while the other pinion is running idly.

6. In a tide motor, the combination of a pair of master gears journaled for rotation in parallel planes, means to operate said gears in accordance with the rise and fall of the tide, a pair of pinions between and in constant mesh with both of said gears, a pair of shafts on which said pinions are loosely mounted, means to cause simultaneous rotation of said shafts in opposite directions, and a pair of clutches between said pinions and the corresponding shafts, the clutches being so arranged that either of said pinions may positively drive said shafts from the gears while the other pinion is running idly.

7. In a tide motor, a float, a power shaft, means to operate said power shaft always in the same direction when the float is either ascending or descending, and means to transmit the power of said shaft at a higher speed, said transmitting means including gear connections and an automatically operable slip connection between different members of said gear connections.

8. In a tide motor, the combination of a float adapted to respond to the rise and fall of the tide, a power shaft, means between the float and the shaft to cause rotation of the shaft always in the same direction when the float is either ascending or descending, and gear connections for transmitting the power from said shaft, said gear connections comprising a shaft, a member having a hollow hub secured thereto, a wheel loosely mounted on said shaft, and a spring surrounding said shaft and connected at one end to said wheel and having its other end fitted within said hollow hub, substantially as set forth.

In testimony whereof I have signed my name to this specification in the presence of two subscribing witnesses.

WILLIAM BRAUNSDORF.

Witnesses:
GEO. L. BEELER,
PHILIP D. ROLLHAUS.